US012236835B2

(12) United States Patent
Wu et al.

(10) Patent No.: US 12,236,835 B2
(45) Date of Patent: Feb. 25, 2025

(54) CONTROL METHOD AND CONTROL APPARATUS FOR DISPLAY PANEL, AND DISPLAY APPARATUS

(71) Applicant: BOE Technology Group Co., Ltd., Beijing (CN)

(72) Inventors: Baoyun Wu, Beijing (CN); Xiyu Zhao, Beijing (CN); Hui Zhao, Beijing (CN); Xinbin Han, Beijing (CN); Yao Liang, Beijing (CN); Kaimin Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/015,084

(22) PCT Filed: Jan. 4, 2022

(86) PCT No.: PCT/CN2022/070150

§ 371 (c)(1),
(2) Date: Jan. 9, 2023

(87) PCT Pub. No.: WO2023/130222

PCT Pub. Date: Jul. 13, 2023

(65) Prior Publication Data

US 2024/0242655 A1 Jul. 18, 2024

(51) Int. Cl.
*G09G 3/20* (2006.01)

(52) U.S. Cl.
CPC ... *G09G 3/2074* (2013.01); *G09G 2300/0823* (2013.01); *G09G 2300/0861* (2013.01); *G09G 2320/0233* (2013.01); *G09G 2320/0247* (2013.01); *G09G 2320/0673* (2013.01); *G09G 2330/021* (2013.01)

(58) Field of Classification Search
CPC ......... G09G 3/2074; G09G 2300/0861; G09G 2320/0233; G09G 2320/0247; G09G 2320/0673; G09G 2330/021
See application file for complete search history.

(56) References Cited

U.S. PATENT DOCUMENTS

| | | | | |
|---|---|---|---|---|
| 2014/0125714 | A1 | 5/2014 | Pyo | |
| 2015/0116373 | A1 | 4/2015 | Kim et al. | |
| 2018/0130433 | A1* | 5/2018 | Sato | G09G 3/3618 |
| 2019/0206355 | A1 | 7/2019 | Morii | |
| 2020/0074921 | A1 | 3/2020 | Peng et al. | |
| 2020/0357320 | A1 | 11/2020 | Park et al. | |
| 2021/0366397 | A1* | 11/2021 | Na | H10K 59/1213 |

(Continued)

FOREIGN PATENT DOCUMENTS

| | | | |
|---|---|---|---|
| CN | 107039010 | A | 8/2017 |
| CN | 108346399 | A | 7/2018 |
| CN | 110010091 | A | 7/2019 |

(Continued)

*Primary Examiner* — Premal R Patel

(74) *Attorney, Agent, or Firm* — Ling Wu; Stephen Yang; Ling and Yang Intellectual Property

(57) ABSTRACT

A control method of a display panel. The method includes the following steps: determining a target refresh frequency of the display panel; determining a data chopping rule adapted to the target refresh frequency according to the first mapping relationship; providing a data signal to the display panel according to a data chopping rule.

18 Claims, 6 Drawing Sheets

(56) References Cited

U.S. PATENT DOCUMENTS

| | | | | | |
|---|---|---|---|---|---|
| 2023/0086548 | A1* | 3/2023 | Li | .......................... | G09G 3/3648 345/212 |
| 2023/0089652 | A1* | 3/2023 | Li | .......................... | G09G 3/3655 345/212 |

FOREIGN PATENT DOCUMENTS

| | | | |
|---|---|---|---|
| CN | 110675824 | A | 1/2020 |
| CN | 110751933 | A | 2/2020 |
| CN | 111199713 | A | 5/2020 |
| CN | 111916013 | A | 11/2020 |
| CN | 112331145 | A | 2/2021 |
| CN | 113327553 | A | 8/2021 |
| CN | 113793569 | A | 12/2021 |

* cited by examiner

CONTROL METHOD AND CONTROL APPARATUS FOR DISPLAY PANEL, AND DISPLAY APPARATUS

CROSS-REFERENCE TO RELATED APPLICATION

This application is a national stage application of PCT Application No. PCT/CN2022/070150, which is filed on Jan. 4, 2022 and entitled "Control Method and Control Apparatus for Display Panel, and Display Apparatus", the content of which should be regarded as being incorporated herein by reference.

TECHNICAL FIELD

The present disclosure relates to, but is not limited to, the field of display technologies, and particularly to a control method and control apparatus for a display panel, and a display apparatus.

BACKGROUND

An Organic Light Emitting Display (OLED) display apparatus is considered as a new application technology of a next generation flat panel display due to its excellent characteristics such as self-luminescence, a high contrast, a small thickness, a wide viewing angle, a fast response speed, applicability for a flexible panel, a wide range of a use temperature, a simple structure and manufacturing process, and the like.

SUMMARY

The following is a summary of subject matters described herein in detail. The summary is not intended to limit the protection scope of claims.

Embodiments of the present disclosure provide a control method and apparatus for a display panel, and a display apparatus.

On the one hand, the embodiment of the present disclosure provides a control method of a display panel, which comprises the following steps: determining a target refresh frequency of the display panel; determining a data chopping rule adapted to the target refresh frequency according to a first mapping relationship; and providing a data signal to the display panel according to a data chopping rule.

In some exemplary implementations, the data chopping rules include one of the following: frame flipping, dot flipping.

In some exemplary implementations, the determining a target refresh frequency of the display panel includes one of the following: determining a target refresh frequency of the display panel according to the received frame rate switching command; determining a target refresh frequency of the display panel by analyzing the received MIPI data.

In some exemplary implementations, the control method of the present embodiment further includes: determining an emission start signal (ESTV) compensation amount corresponding to the target refresh frequency according to the second mapping relationship.

In some exemplary implementations, the control method of the present embodiment further includes: when the display panel is switched to the target refresh frequency, compensating an emission start signal by using the emission start signal compensation amount corresponding to the target refresh frequency.

In some exemplary implementations, the control method of the present embodiment further includes: determining a gamma voltage compensation amount corresponding to the target refresh frequency according to a third mapping relationship.

In some exemplary implementations, the control method of the present embodiment further includes: when the display panel is switched to the target refresh frequency, compensating a data voltage supplied to the display panel by using the gamma voltage compensation amount corresponding to the target refresh frequency.

On the other hand, the embodiment of the present disclosure provides a control apparatus for a display panel, comprising: a frequency determination module configured to determine a target refresh frequency of the display panel; a rule determination module configured to determine a data chopping rule adapted to the target refresh frequency according to a first mapping relationship; a control module configured to provide a data signal to the display panel according to the data chopping rule.

In some exemplary implementations, the control apparatus of the present embodiment further includes: a first compensation module configured to determine an emission start signal compensation amount corresponding to the target refresh frequency according to a second mapping relationship; when the display panel is switched to the target refresh frequency, an emission start signal is compensated by using the emission start signal compensation amount corresponding to the target refresh frequency.

In some exemplary implementations, the control apparatus of the present embodiment further includes: a second compensation module configured to determine a gamma voltage compensation amount corresponding to the target refresh frequency according to a third mapping relationship; when the display panel is switched to the target refresh frequency, a data voltage supplied to the display panel is compensated by using the gamma voltage compensation amount corresponding to the target refresh frequency.

In another aspect, an embodiment of the present disclosure provides a display panel, which includes the aforementioned control apparatus.

In some exemplary implementations, the display panel includes: a pixel array, wherein the pixel array includes multiple sub-pixels and at least one sub-pixel includes a light emitting element and a pixel circuit driving the light emitting element to emit light; and the pixel circuit includes multiple transistors and at least one capacitor.

In another aspect, an embodiment of the present disclosure provides a control apparatus, which includes: a memory and a processor; the memory is configured to store a computer program, and the processor is configured to execute the computer program to implement the control method as described above.

In another aspect, an embodiment of the present disclosure provides a non-transitory computer readable storage medium, which stores a computer program. The control method as described above is implemented when the computer program is performed.

Other aspects may be understood upon reading and understanding the drawings and the detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of one or more components in the drawings do not reflect true scales, and are only intended to schematically describe contents of the present disclosure.

DETAILED DESCRIPTION

Figure 1:
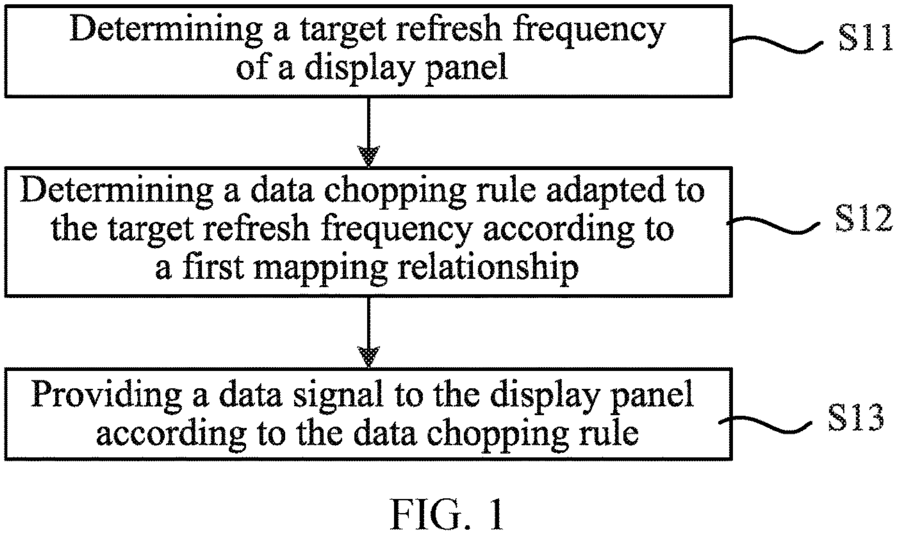
FIG. 1 is a flowchart of a control method for a display panel according to at least one embodiment of the present disclosure.

The embodiments of the present disclosure will be described below in combination with the drawings in detail. Implementations may be implemented in multiple different forms. Those of ordinary skill in the art may easily understand such a fact that manners and contents may be transformed into other forms without departing from the purpose and scope of the present disclosure. Therefore, the present disclosure should not be explained as being limited to contents described in following implementation only. The embodiments in the present disclosure and features in the embodiments may be combined randomly with each other without conflict.

In the drawings, a size of one or more constituent elements, a thickness of a layer, or a region is sometimes exaggerated for clarity. Therefore, a mode of the present disclosure is not necessarily limited to the size, and a shape and a size of one or more components in the drawings do not reflect a true proportion. In addition, the drawings schematically illustrate ideal examples, and one implementation of the present disclosure is not limited to the shapes, numerical values, or the like shown in the drawings.

Ordinal numerals such as “first”, “second”, and “third” in the specification are set to avoid confusion of constituent elements, but not to set a limit in quantity. In the present disclosure, “multiple” represents two or more than two.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements are changed as appropriate according to a direction where the constituent elements are described. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, it may be a fixed connection, a detachable connection, or an integrated connection; it may be a mechanical connection or a connection; it may be a direct connection, an indirect connection through an intermediate component, or communication inside two components. Those of ordinary skills in the art may understand meanings of the above mentioned terms in the present disclosure according to situations.

In the specification, “electrical connection” includes a case that constituent elements are connected together through an element with a certain electrical effect. The “element having some electrical function” is not particularly limited as long as electrical signals between the connected constituent elements may be transmitted. Examples of the “element having some electrical function” not only include an electrode and a wiring, but further include a switch element such as a transistor, a resistor, an inductor, a capacitor, another element with multiple functions, etc.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

In the present disclosure, “about” and “approximately” refers to that a boundary is defined not so strictly and numerical values within process and measurement error ranges are allowed.

With an application of a Low Temperature Polycrystalline Oxide (LTPO) technology, a refresh frequency of a picture of an OLED display panel may be reduced to 1 Hz or even lower. Since a brightness change frequency recognizable by human eyes is about 24 Hz to 30 Hz, for a display panel based on the LTPO technology, when displaying at a low frame rate (i.e., lower than a conventional refresh frequency of 60 Hz), a brightness of a whole picture needs to be kept constant, and a low frame rate brightness change cannot be introduced in a display process.

Embodiments of the present disclosure provide a control method for a display panel, a control apparatus for a display panel, and a display apparatus, which may improve a display effect of the display panel.

FIG. 1 is a flowchart of a control method for a display panel according to at least one embodiment of the present disclosure. As shown in FIG. 1, an embodiment of the present disclosure provides a control method for a display panel, which includes the following steps S11 to S13.

Step S11 includes determining a target refresh frequency of a display panel;

Step S12 includes determining a data chopping rule adapted to the target refresh frequency according to a first mapping relationship;

Step S13 includes providing a data signal to the display panel according to a data chopping rule.

In some exemplary implementations, the control method of the present embodiment may be used to control the display of the OLED display panel. However, this embodiment is not limited thereto.

In some exemplary implementations, the control method of the present embodiment may be applied to a Display Driver Integrated Circuit (DDIC) chip. Taking a display apparatus adopting an Application Processor (AP), a DDIC chip, and a display panel architecture as an example, after the AP renders and generates image data, the AP sends the image data to the DDIC chip, and the DDIC chip controls the display panel to display an image according to the image data. In this example, the DDIC chip may output a data signal to the display panel according to a data chopping rule, thereby improving the display effect of the display panel.

In some exemplary implementations, the data chopping rule may include one of the following: frame flipping, dot flipping. However, this embodiment is not limited thereto. For example, a data chopping rule can also include: row flipping, column flipping, and so on.

In some exemplary implementations, the control method of the present embodiment may further include: determining an emission start signal compensation amount corresponding to the target refresh frequency according to a second mapping relationship.

In some exemplary implementations, the control method of the present embodiment may further include: compensating an emission start signal by using the emission start signal compensation amount corresponding to the target refresh frequency when the display panel is switched to the target refresh frequency. In this exemplary implementation, by compensating the emission start signal during the switching process of the target refresh frequency, the brightness change brought during the switching process of the refresh frequency can be eliminated, and the dynamic non-inductive switching of the refresh frequency can be realized.

In some exemplary implementations, the control method of the present embodiment may further include: determining a gamma voltage compensation amount corresponding to the target refresh frequency according to a third mapping relationship.

In some exemplary implementations, the control method of the present embodiment may further include: compensating a data voltage supplied to the display panel by using the gamma voltage compensation amount corresponding to the target refresh frequency when the display panel is switched to the target refresh frequency. In this exemplary implementation, by compensating the gamma voltage during the switching process of the target refresh frequency, the brightness change brought during the switching process of the refresh frequency can be eliminated, and the dynamic non-inductive switching of the refresh frequency can be realized.

Solutions of this embodiment will be described below through multiple examples.

Figure 2:
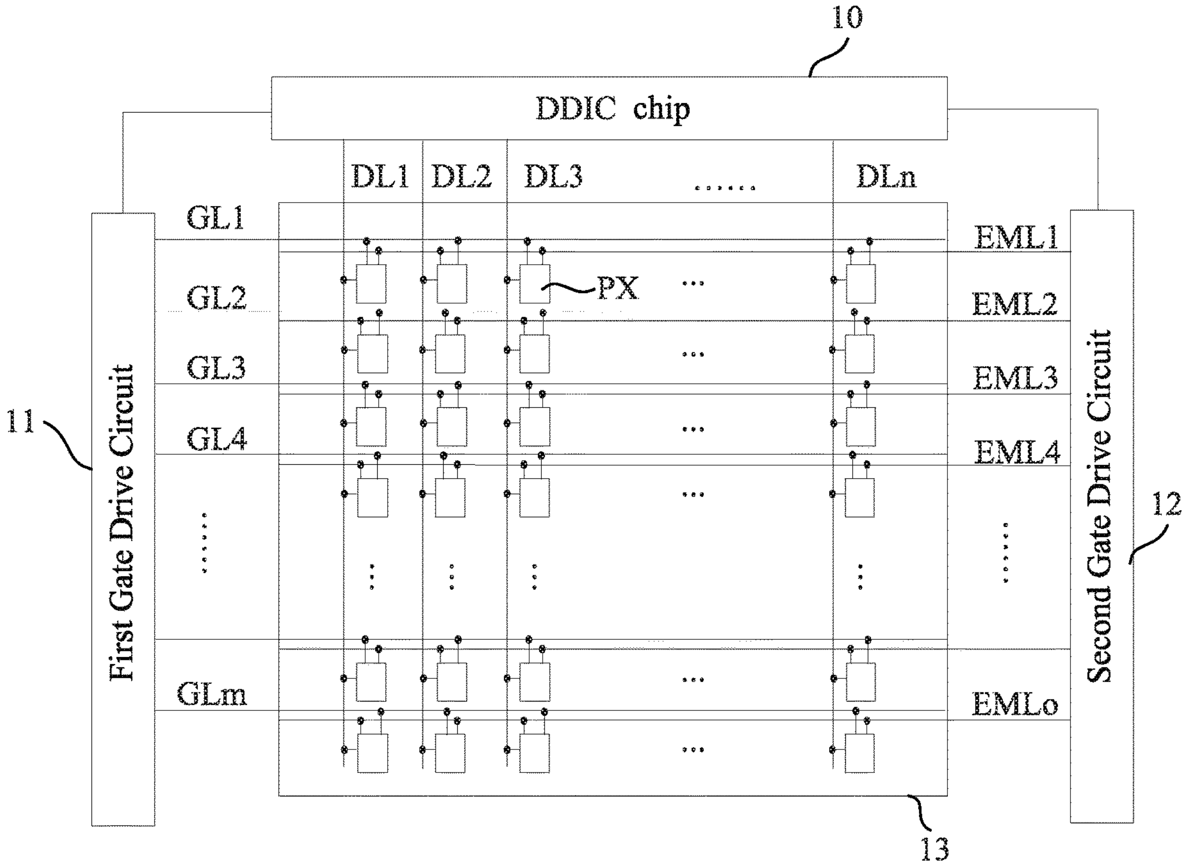
FIG. 2 is a schematic diagram of a display apparatus according to at least one embodiment of the present disclosure.

FIG. 2 is a schematic diagram of a display apparatus according to at least one embodiment of the present disclosure. In some exemplary implementations, as shown in FIG. 2, the display apparatus of the present exemplary embodiment may include: a display panel and a control apparatus. The control apparatus may include a DDIC chip 10. The display panel may include: a pixel array 13, multiple first signal lines (for example, scan lines GL1 to GLm, light emitting control lines EML1 to EMLo) extending along a first direction, and multiple second signal lines (for example, data lines DLI to DLn) extending along a second direction. The first direction (for example, a horizontal direction) intersects with the second direction (for example, a vertical direction), for example, the first direction and the second direction may be perpendicular to each other. Herein, m, n, and o are all integers. A gate drive circuit (for example, including a first gate drive circuit 11 and a second gate drive circuit 12) is also disposed on the display panel. The DDIC chip 10 and the gate drive circuit may be configured to drive the pixel array 13.

In some exemplary implementations, the DDIC chip 10 may provide a clock signal, a start signal, and the like adapted to a specification of the first gate drive circuit 11 to the first gate drive circuit 11, and provide a clock signal, a start signal, and the like adapted to a specification of the second gate drive circuit 12 to the second gate drive circuit 12. The first gate drive circuit 11 may generate scan signals provided to the scan lines GL1 to GLm by utilizing the clock signal, the start signal, and the like received from the DDIC chip 10. The second gate drive circuit 12 may generate light emitting control signals provided to the light emitting control lines EML1 to EMLm by utilizing the clock signal, the emission start signal, and the like received from the DDIC chip 10. The DDIC chip 10 may also be adapted to generate data signals provided to the data lines DLI to DLn.

In some exemplary implementations, the first gate drive circuit 11 may provide scan signals with on-level pulses sequentially to the scan lines GL1 to GLm. For example, the first gate drive circuit may be constructed in a form of a shift register, and may generate the scan signals by transmitting the start signal provided in a form of on-level pulse sequentially to a next-stage circuit under controlling of the clock signal. The second gate drive circuit 12 may provide light emitting control signals with off-level pulses sequentially to the light emitting control lines EML1 to EMLo. For example, the second gate drive circuit 12 may be constructed in a form of the shift register, and may generate the light emitting control signals by transmitting the emission start signal provided in a form of off-level pulse sequentially to a next-stage circuit under controlling of the clock signal. However, this embodiment is not limited thereto.

In some exemplary implementations, the pixel array 13 may include multiple sub-pixels PX. One pixel unit may include three sub-pixels. The three sub-pixels are a red sub-pixel, a green sub-pixel, and a blue sub-pixel, respectively. However, this embodiment is not limited thereto. In some examples, a pixel unit may include four sub-pixels, and the four sub-pixels may be a red sub-pixel, a green sub-pixel, a blue sub-pixel, and a white sub-pixel respectively. In some examples, the sub-pixel may be shaped into a rectangle, a rhombus, a pentagon, or a hexagon. When a pixel unit includes three sub-pixels, the three sub-pixels may be arranged side by side horizontally, side by side vertically, or in a shape of a Chinese character "do". When a pixel unit includes four sub-pixels, the four sub-pixels may be arranged side by side horizontally, side by side vertically, or in a shape of a square. However, this embodiment is not limited thereto.

In some exemplary implementations, at least one sub-pixel PX includes: a light emitting element and a pixel circuit driving the light emitting element to emit light. The light emitting element is electrically connected with the corresponding pixel circuit. The light emitting element may be an OLED apparatus including an anode, a cathode, and an organic light emitting layer disposed between the anode and the cathode. In some examples, the pixel circuit may include multiple transistors and at least one capacitor. For example, the pixel circuit may be of a structure of 5T1C, 5T2C, 6T1C, 7T1C, 8T1C or 8T2C, etc. However, this embodiment is not limited thereto.

Figure 3:
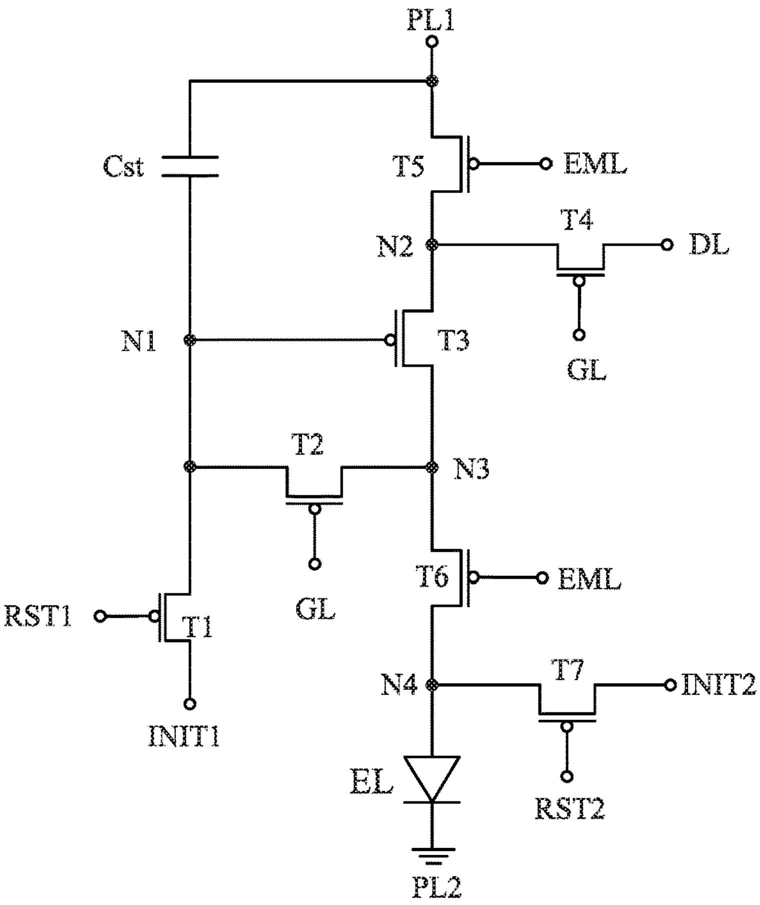
FIG. 3 is an equivalent circuit diagram of a pixel circuit according to at least one embodiment of the present disclosure.
Figure 4:
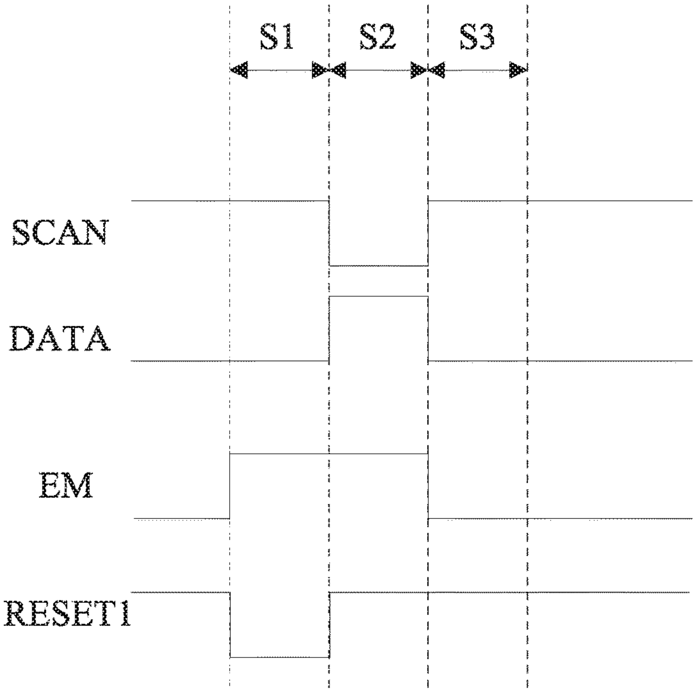
FIG. 4 is a working sequence diagram of a pixel circuit according to at least one embodiment of the present disclosure.

FIG. 3 is an equivalent circuit diagram of a pixel circuit according to at least one embodiment of the present disclosure. FIG. 4 is a working sequence diagram of a pixel circuit according to at least one embodiment of the present disclosure. The pixel circuit of the present exemplary embodiment is a 7T1C structure. However, this embodiment is not limited thereto.

In some exemplary implementations, as shown in FIG. 3, the pixel circuit of this example includes six switching transistors (T1, T2, and T4 to T7), a drive transistor T3, and a storage capacitor Cst. The six switching transistors are respectively a data writing transistor T4, a threshold compensation transistor T2, a first light emitting control transistor T5, a second light emitting control transistor T6, a first reset transistor T1, and a second reset transistor T7. The light emitting element EL includes an anode, a cathode and an organic light emitting layer disposed between the anode and the cathode.

In some exemplary implementations, the drive transistor and the six switching transistors may be P-type transistors or may be N-type transistors. Adopting a same type of transistors in a pixel circuit may simplify a process flow, reduce a process difficulty of a display substrate, and improve a yield of products. In some possible implementations, the drive transistor and the six switching transistors may include a P-type transistor and an N-type transistor.

In some exemplary implementations, a Low Temperature Poly-Silicon thin film transistor, or an oxide thin film transistor, or a Low Temperature Poly-Silicon thin film transistor and an oxide thin film transistor may be adopted for the drive transistor and the six switching transistors. An active layer of a Low Temperature Poly-Silicon thin film transistor is made of Low Temperature Poly-Silicon (LTPS), and an active layer of an oxide thin film transistor is made of an oxide semiconductor (Oxide). A Low-temperature Poly-Silicon thin film transistor has advantages such as a high mobility and fast charging, while an oxide thin film transistor has an advantage such as a low leakage current. The Low Temperature Poly-Silicon thin film transistor and the oxide thin film transistor are integrated on one display substrate to form a Low Temperature Polycrystalline Oxide (LTPO) display substrate, and advantages of both the Low Temperature Poly-Silicon thin film transistor and the oxide thin film transistor may be utilized, which may achieve low frequency drive, reduce power consumption, and improve display quality.

In some exemplary implementations, as shown in FIG. 3, a display substrate includes a scan line GL, a data line DL, a first power supply line PL1, a second power supply line PL2, an emitting control line EML, a first initial signal line INIT1, a second initial signal line INIT2, a first reset control line RST1, and a second reset control line RST2. In some examples, the first power supply line PL1 is configured to provide a constant first voltage signal VDD to a pixel circuit, the second power supply line PL2 is configured to provide a constant second voltage signal VSS to a pixel circuit, and the first voltage signal VDD is greater than the second voltage signal VSS. The scan line GL is configured to provide a scan signal SCAN to the pixel circuit, the data line DL is configured to provide a data signal DATA to the pixel circuit, the light emitting control line EML is configured to provide a light emitting control signal EM to the pixel circuit, the first reset control line RST1 is configured to provide a first reset control signal RESET1 to the pixel circuit, and the second reset control line RST2 is configured to provide a second reset control signal RESET2 to the pixel circuit. In some examples, in a pixel circuit of an n-th row, a first reset control line RST1 may be electrically connected with a scan line GL of the pixel circuit of an (n−1)-th row to be inputted with a scan signal SCAN(n−1), that is, a first reset control signal RESET1(*n*) is the same as the scan signal SCAN(n−1). A second reset control line RST2 may be electrically connected with a scan line GL of a pixel circuit of an n-th row to be inputted with a scan signal SCAN(n), that is, a second reset control signal RESET2(*n*) is the same as the scan signal SCAN(n−1). In some examples, a second reset control line RST2 with which the pixel circuit of the n-th row is electrically connected and a first reset control line RST1 with which the pixel circuit of the (n+1)-th row is electrically connected have an integral structure. Thus, signal lines of the display substrate may be reduced, and a narrow frame of the display substrate may be achieved. However, this embodiment is not limited thereto.

In some exemplary implementations, the first initial signal line INIT1 is configured to provide a first initial signal to the pixel circuit, the second initial signal line INIT2 is configured to provide a second initial signal to the pixel circuit. For example, the first initial signal and the second initial signal may be constant voltage signals, and their magnitudes may be between a first voltage signal VDD and a second voltage signal VSS, but not limited to this.

In some exemplary implementations, as shown in FIG. 3, a drive transistor T3 is electrically connected with a light emitting element EL, and outputs a drive current to drive the light emitting element EL to emit light under control of a scan signal SCAN, a data signal DATA, a first voltage signal VDD, a second voltage signal VSS and etc. A gate of a data writing transistor T4 is electrically connected with a scan line GL, a first electrode of the data writing transistor T4 is electrically connected with a data line DL, and a second electrode of the data writing transistor T4 is electrically connected with a first electrode of the drive transistor T3. A gate of a threshold compensation transistor T2 is electrically connected with a scan line GL, a first electrode of the threshold compensation transistor T2 is electrically connected with a gate of the drive transistor T3, and a second electrode of the threshold compensation transistor T2 is electrically connected with a second electrode of the drive transistor T3. A gate of a first light emitting control transistor T5 is electrically connected with a light emitting control line EML, a first electrode of the first light emitting control transistor T5 is electrically connected with a first power supply line PL1, and a second electrode of the first light emitting control transistor T5 is electrically connected with the first electrode of the drive transistor T3. A gate of a second light emitting control transistor T6 is electrically connected with the light emitting control line EML, a first electrode of the second light emitting control transistor T6 is electrically connected with the second electrode of the drive transistor T3, and a second electrode of the second light emitting control transistor T6 is electrically connected with an anode of the light emitting element EL. A first reset transistor T1 is electrically connected with the gate of the drive transistor T3 and configured to reset the gate of the drive transistor T3, and a second reset transistor T7 is electrically connected with the anode of the light emitting element EL and configured to reset the anode of the light emitting element EL. A gate of the first reset transistor T1 is electrically connected with a first reset control line RST1, a first electrode of the first reset transistor T1 is electrically connected with a first initial signal line INIT1, and a second electrode of the first reset transistor T1 is electrically connected with the gate of the drive transistor T3. A gate of the second reset transistor T7 is electrically connected with a second reset control line RST2, a first electrode of the second reset transistor T7 is electrically connected with a second initial signal line INIT2, and a second electrode of the second reset transistor T7 is electrically connected with the anode of the light emitting element EL. A first electrode of a storage capacitor Cst is electrically connected with the gate of the drive transistor T3, and a second electrode of the storage capacitor Cst is electrically connected with the first power supply line PL1.

In this example, a first node N1 is a connection point for the storage capacitor Cst, the first reset transistor T1, the drive transistor T3, and the threshold compensation transistor T2, a second node N2 is a connection point for the first light emitting control transistor T5, the data writing transistor T4, and the drive transistor T3, a third node N3 is a connection point for the drive transistor T3, the threshold compensation transistor T2, and the second light emitting control transistor T6, and a fourth node N4 is a connection point for the second light emitting control transistor T6, the second reset transistor T7, and the light emitting element EL.

A working process of the pixel circuit illustrated in FIG. 3 will be described below with reference to FIG. 4. The description is given by taking a case in which multiple transistors included in the pixel circuit shown in FIG. 3 are all P-type transistors as an example.

In some exemplary embodiments, as shown in FIG. 4, during one frame display period, a working process of a pixel circuit of a first structure includes: a first stage S1, a second stage S2, and a third stage S3.

The first stage S1 is referred to as a reset stage. A first reset control signal RESET1 provided by the first reset control line RST1 is a low-level signal, so that the first reset transistor T1 is turned on, and a first initial signal provided by the first initial signal line INIT1 is provided to the first node N1 to initialize the first node N1 and clear an original data voltage in the storage capacitor Cst. A scan signal SCAN provided by the scan line GL is a high level signal, and a light emitting control signal EM provided by the light emitting control line EML is a high level signal, so that the data writing transistor T4, the threshold compensation transistor T2, the first light emitting control transistor T5, the second light emitting control transistor T6, and the second reset transistor T7 are turned off. In this stage, the light emitting element EL does not emit light.

The second stage S2 is referred to as a data writing stage or a threshold compensation stage. A scan signal SCAN provided by the scan line GL is a low-level signal, a first reset control signal RESET1 provided by the first reset control line RST1 and an emitting control signal EM provided by the emitting control line EML are both high-level signals, and the data line DL outputs a data signal DATA. In this stage, the second electrode of the storage capacitor Cst is at a low level, so that the drive transistor T3 is turned on. The scan signal SCAN is a low level signal, so that the threshold compensation transistor T2, the data writing transistor T4, and the second reset transistor T7 are turned on. The threshold compensation transistor T2 and the data writing transistor T4 are turned on, so that a data voltage Vdata output by the data line DL is provided to the first node N1 through the second node N2, the turned on drive transistor T3, the third node N3, and the turned on threshold compensation transistor T2, and the storage capacitor Cst is charged with a difference between the data voltage Vdata output by the data line DL and a threshold voltage of the drive transistor T3. A voltage of the first electrode (that is, the first node N1) of the storage capacitor Cst is Vdata-|Vth|, wherein Vdata is the data voltage output by the data line DL, and Vth is the threshold voltage of the drive transistor T3. The second reset transistor T7 is turned on, so that a second initial signal provided by the second initial signal line INIT2 is provided to the anode of the light emitting element EL to initialize (reset) the anode of the light emitting element EL and clear a pre-stored voltage therein, so as to complete initialization, thereby ensuring that the light emitting element EL does not emit light. The first reset control signal RESET1 provided by the first reset control line RST1 is a high level signal, so that the first reset transistor T1 is turned off. The light emitting control signal EM provided by the light emitting control signal line EML is a high level signal, so that the first light emitting control transistor T5 and the second light emitting control transistor T6 are turned off.

The third stage S3 is referred to as a light emitting stage. A light emitting control signal EM provided by the light emitting control signal line EML is a low level signal, and a scan signal SCAN provided by the scan line GL and a first reset control signal RESET1 provided by the first reset control line RST1 are high level signals. The emitting control signal EM provided by the emitting control signal line EML is a low level signal, so that the first emitting control transistor T5 and the second emitting control transistor T6 are turned on, and a first voltage signal VDD output by the first power supply line PL1 provides a drive voltage to the anode of the light emitting element EL through the turned on first emitting control transistor T5, the drive transistor T3, and the second emitting control transistor T6 to drive the light emitting element EL to emit light.

In a drive process of the pixel circuit, a drive current flowing through the drive transistor T3 is determined by a voltage difference between the gate and the first electrode of the drive transistor T3. Since the voltage of the first node N1 is Vdata-|Vth|, the drive current of the drive transistor T3 is as follows.

$$I = K\times \mathrm{V}gs-\mathrm{V}th)^2 = K\times[(\mathrm{V}DD-\mathrm{Vdata}+|\mathrm{V}th|)-\mathrm{V}th]^2 = K\times[\mathrm{V}DD-\mathrm{Vdata}]^2$$

I is the drive current flowing through the drive transistor T3, that is, the drive current for driving the light emitting element EL; K is a constant; Vgs is the voltage difference between the gate and the first electrode of the drive transistor T3; Vth is the threshold voltage of the drive transistor T3; Vdata is the data voltage output by the data line DL; and VDD is the first voltage signal output by the first power supply line PL1.

It may be seen from the above formula that a current flowing through the light emitting element EL has nothing to do with the threshold voltage of the drive transistor T3. Therefore, the pixel circuit of this embodiment may better compensate the threshold voltage of the drive transistor T3.

In some exemplary implementations, the DDIC chip may at least include: a gamma voltage generation circuit. The gamma voltage generating circuit can generate a plurality of gamma reference voltages using a high voltage and a low voltage, and generate a plurality of gamma voltages according to the plurality of gamma reference voltages. The gamma voltage generating circuit can supply a data voltage to the display panel through a plurality of data output channels to improve the driving capability of the data voltage.

Figure 5A:
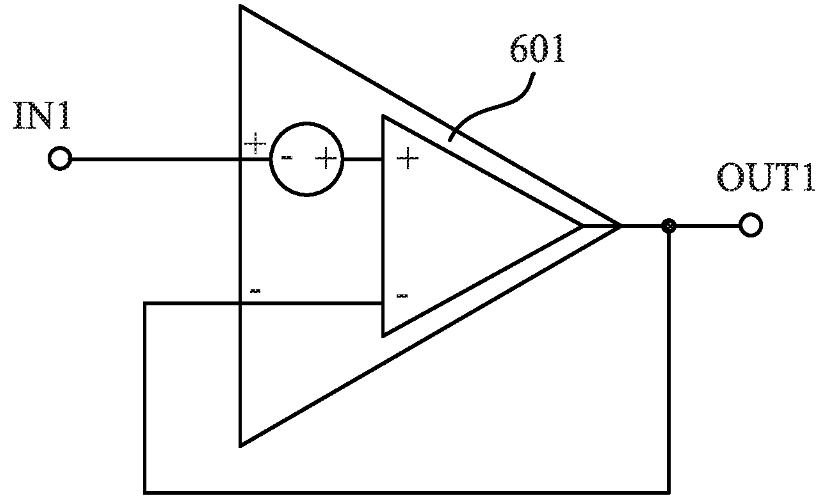
FIG. 5A and FIG. 5B are schematic diagrams of principle of a data chopping function according to at least one embodiment of the present disclosure.
Figure 5B:
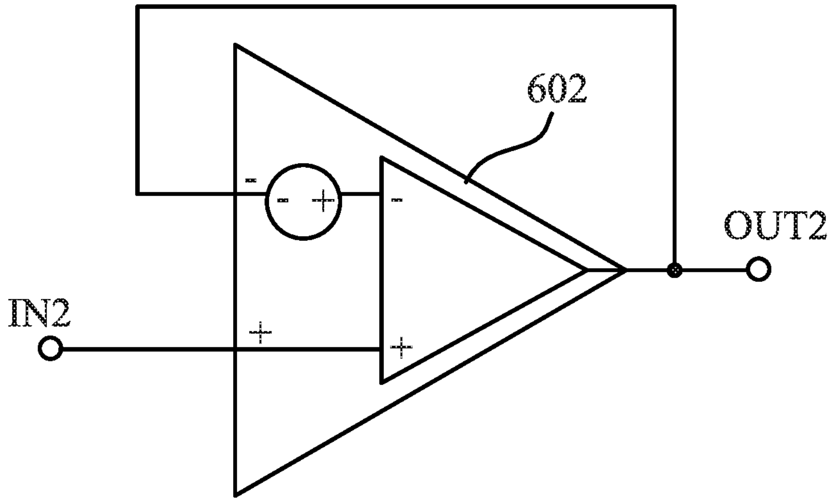

Aiming at the display problem brought by the difference of an OP (Operational Amplifier) used for a data voltage output in the DDIC chip of an OLED display substrate, a data chopping function is introduced into the DDIC chip. FIG. 5A and FIG. 5B are schematic diagrams of principle of a data chopping function according to at least one embodiment of the present disclosure. In some examples, as shown in FIG. 5A and FIG. 5B, the data output channel may include Operational Amplifiers (for example, Operational Amplifiers 601 and 602), a non-inverting input terminal of the Operational Amplifiers may receive the gamma voltage generated by the gamma voltage generation circuit, and an inverting input terminal of the Operational Amplifiers is electrically connected to an output terminal of the Operational Amplifiers. Due to the influence of the DDIC chip manufacturing process, there will be differences in the operational amplifiers, which will cause an offset voltage (offset) in the data output channel. As shown in FIG. 5A, the Operational Amplifier 601 will generate a positive polarity offset voltage ΔV, for example, the gamma voltage Vgma is a input to the first input terminal IN1, and the data voltage Vout1=Vgma+ΔV is an output to a first output terminal OUT1. As shown in FIG. 5B, the Operational Amplifier 602 will generate a negative polarity offset voltage ΔV, for example, the gamma voltage Vgma is a input to the second input terminal IN2, and the data voltage Vout2=Vgma−ΔV is an output to a second output terminal OUT2.

In some examples, a data output channel of the DDIC chip is affected by a difference of the Operational Amplifier, and its output data voltage will have different offset voltage. For example, the expected output data voltages (i.e., gamma voltages) of a plurality of the data output channels are Vgma1, Vgma2, Vgma3, . . . , respectively, however, the actual output data voltages of the plurality of the data voltage output channels will become Vgma1+ΔV1, Vgma2+ΔV2, Vgma3+ΔV3, . . . due to the influence of the offset voltage brought by the Operational Amplifier. When an OLED display panel displays a solid color picture, the vertical bar display problem will be caused because of the different offset voltages output by the different data output channels. In order to improve the display effect, the data chopping function is introduced, that is, the data voltages output by the different data output channels are homogenized in the time domain. According to certain rules, the different data output channels output Vgma+ΔV or Vgma-ΔV respectively at different time points, that is, output offset voltages with the different polarities. In this way, from the time domain, the output data voltage of the data output channel can be averaged to Vgma.

In some exemplary implementations, in order to control the different offset voltages of the data output channel brought by the Operational Amplifier differences, the data output channel may include: an operational amplifier circuit and a chopping control circuit. The operational amplifier circuit may include a first operational amplifier (for example, operational amplifier 601 in FIG. 5A) and a second operational amplifier (for example, operational amplifier 602 in FIG. 5B). An input terminal of the operational amplifier circuit may be electrically connected with a non-inverting input terminal of the first operational amplifier and a non-inverting input terminal of the second operational amplifier, an inverting input terminal of the first Operational Amplifier is electrically connected with an output terminal of the first Operational Amplifier, and an inverting input terminal of the second Operational Amplifier is electrically connected with an output terminal of the second Operational Amplifier. The chopping control circuit may be electrically connected to an output terminal of the first Operational Amplifier and an output terminal of the second Operational Amplifier and configured to control the output terminal of the first Operational Amplifier to output a data voltage or the output terminal of the second Operational Amplifier to output a data voltage. However, this embodiment is not limited thereto.

In some exemplary implementations, the display control of the display panel may be performed in accordance with data chopping rules to improve the display effect of the display panel. For example, the data chopping rule may include at least one of the following: frame flipping, dot flipping. In this example, the data chopping rule refers to the rule that the DDIC chip implements the data chopping function. The DDIC chip can control the polarity of the offset voltage of the data voltage according to the data chopping rule.

Figure 6A:
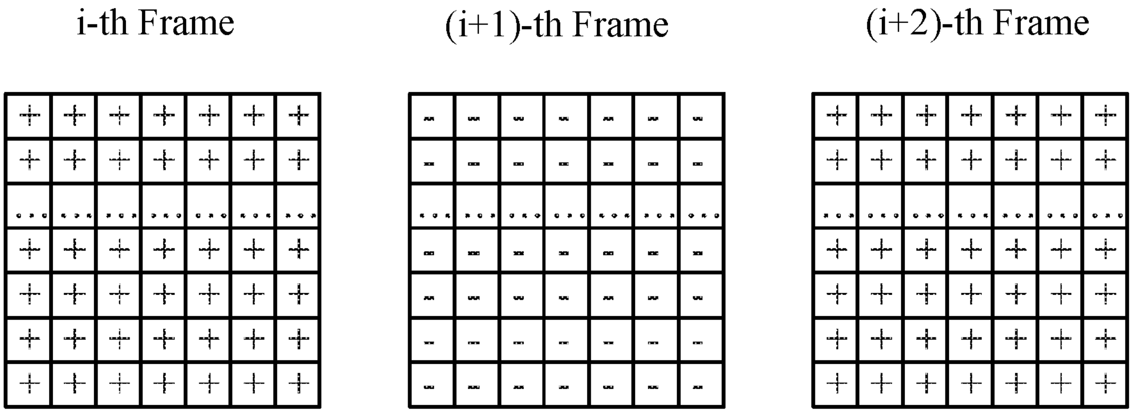
FIG. 6A and FIG. 6B are schematic diagrams of a data chopping rule according to at least one embodiment of the present disclosure.
Figure 6B:
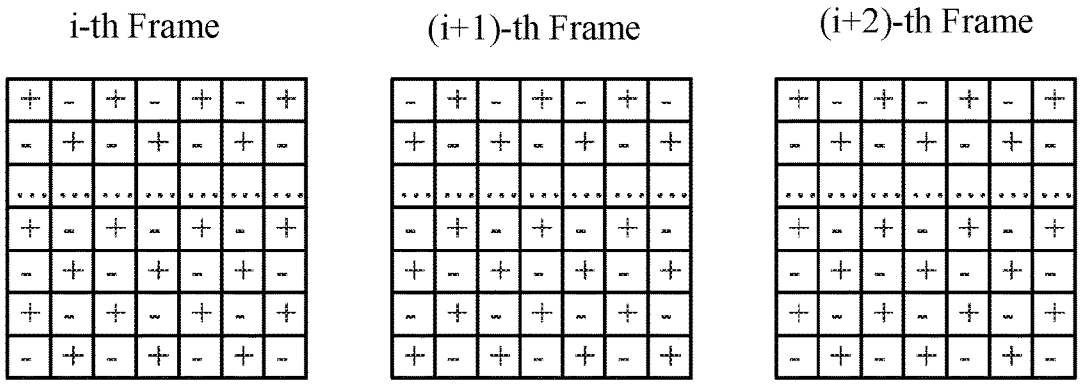

FIG. 6A and FIG. 6B are schematic diagrams of a data chopping rule according to at least one embodiment of the present disclosure. FIG. 6A is a schematic diagram of a frame flipping rule and FIG. 6B is a schematic diagram of a dot flipping rule. The frame flipping refers to a polarity transformation of an offset voltage of a data signal between two connected frames, and the dot flipping refers to a polarity transformation of an offset voltage of a data signal between adjacent two points of each frame, and there is also a polarity transformation of an offset voltage between adjacent two frames. In FIG. 6A and FIG. 6B, "+" denotes the offset voltage that generates a positive polarity. For example, as shown in FIG. 5A, the data voltage Vout1=Vgma+ΔV output from the output terminal of the Operational Amplifier, wherein, ΔV denotes the offset voltage. In FIG. 6A and FIG. 6B, "−" denotes the offset voltage that generates a negative polarity. For example, as shown in FIG. 5B, the data voltage Vout2=Vgma−ΔV output from the output terminal of the Operational Amplifier, wherein, ΔV denotes the offset voltage.

As shown in FIG. 6A, the left side diagram shows the polarity of the offset voltages in the current i-th frame, the middle diagram shows the polarity of the offset voltages in the (i+1)-th frame, and the right side diagram shows the polarity of the offset voltages in the (i+2)-th frame. The polarities of the offset voltages corresponding to the sub-pixels of the current i-th frame are all the same, for example, are all positive, the polarities of the offset voltages corresponding to the sub-pixels of the (i+1)-th frame are all opposite to the previous frame, for example, are all negative, and the polarities of the offset voltages corresponding to the sub-pixels of the (i+2)-th frame are all opposite to the previous frame, for example, are all positive. As shown in FIG. 6B, the polarity of the offset voltage corresponding to each sub-pixel of the current i-th frame is opposite to the polarity of the offset voltages corresponding to its adjacent sub-pixels. For example, if the polarity of the offset voltage corresponding to a sub-pixel of the i-th frame is positive, the polarity of the offset voltages corresponding to the adjacent sub-pixels of the sub-pixel is negative. Similarly, the polarity of the offset voltages corresponding to the sub-pixels of the (i+1)-th frame and the (i+2)-th frame is similar to the polarity of the offset voltages corresponding to the sub-pixels of the i-th frame. Moreover, the polarity of the offset voltages corresponding to the sub-pixels of the next frame is opposite to that of the previous frame. However, this embodiment is not limited thereto. In other examples, the data chopping rule may also include: row flipping, column flipping, and so on. For example, the polarity of the offset voltages corresponding to the sub-pixels in the same column of the current frame is the same, and the polarity of the offset voltages corresponding to the sub-pixels in the adjacent columns is opposite, which is called column flipping. The polarity of the offset voltages corresponding to the sub-pixels in the same row of the current frame is the same, and the polarity of the offset voltages corresponding to the sub-pixels in the adjacent rows is opposite, which is called row flipping. The polarity of the offset voltages corresponding to the sub-pixels of the same two rows on the current frame is the same, and the polarities of the offset voltages corresponding to the sub-pixels of the two adjacent upper and lower rows are opposite, so this is a two-row flipping.

In some exemplary implementations, after the DDIC chip receives a frame rate switching command issued by the AP, the DDIC chip may determine a target refresh frequency to which the display panel is to be switched. The frame rate switching command can carry the target refresh frequency to which the display panel is to be switched. Or, the AP can send out MIPI (Mobile Industry Processor Interface) data, and after the DDIC chip receives and analyzes the MIPI data, it can determine the target refresh frequency to which the display panel is to be switched. However, this embodiment is not limited thereto.

In some exemplary implementations, the DDIC chip pre-stores a first mapping relationship from which the data chopping rule adapted to the target refresh frequency can be determined. As shown in Table 1, the first mapping relationship stored in the DDIC chip may include a column of the refresh frequencies and a corresponding column of the data chopping rules, and there is a one to one correspondence between a refresh frequency and a data chopping rule.

TABLE 1

| First Mapping Relationship | |
|---|---|
| Refresh frequency 1 | Data chopping rule 1 |
| Refresh frequency 2 | Data chopping rule 2 |
| . . . | . . . |
| Refresh frequency n | Data chopping rule n |

In some exemplary implementations, the refresh frequency in Table 1 may range from about 0 Hz to 120 Hz. For example, the refresh frequency 1 is 60 Hz, and the corresponding data chopping rule 1 can be a dot flipping; the refresh frequency 2 is 70 Hz, and the corresponding data chopping rule 2 can be a frame flipping. However, this embodiment is not limited thereto.

In some exemplary implementations, the DDIC chip of this embodiment may automatically switch the data chopping rule according to a target refresh frequency of the display panel. For example, when the target refresh frequency of the display panel is a normal refresh frequency, the data chopping rule can be determined as a frame flipping, thus saving power consumption; when the target refresh frequency of the display panel is a low frequency refresh frequency, the data chopping rule can be determined as a dot flipping, so as to improve the flicker effect under the low frequency display and further improve the display effect. In this example, the data chopping rule can be dynamically changed according to the target refresh frequency of the display panel, thus ensuring the display effect.

In some exemplary implementations, when the display panel performs frequency switching (for example, switching from an original refresh frequency to a target refresh frequency), a brightness change occurs at the moment of switching between the different refresh frequencies due to the differences in the load of the DDIC chip, the state of the driving transistor, etc., thereby causing a flicker problem observed by the human eye. At the moment of the refresh frequency switching, the flicker problem can be effectively avoided by introducing the compensation mechanism of an emission start signal (ESTV). In some examples, the second gate drive circuit may include a plurality of cascaded light emitting control circuits, which generally control on and off of a plurality of transistors in the circuit by clock signal, high level signal, low level signal and the like, thereby realizing conversion of an input emission start signal (ESTV) into an output light emitting control signal EM. The light emitting control signal EM output by the light emitting control circuit may be supplied to the pixel circuit through the light emitting control line for controlling the light emitting element to emit light. That is, the duty cycle of the light emitting control signal EM can determine the duty cycle of the bright state in the display brightness waveform of the light emitting element. Therefore, when the light emitting brightness of the light emitting element is not within the predetermined brightness range, the duty cycle of the bright state in the display brightness waveform of the light emitting element can be adjusted by adjusting the duty cycle of the light emitting control signal EM to control the light emitting brightness of the light emitting element. In a general light emitting control circuit, an emission start signal ESTV is input from an input terminal and a light emitting control signal EM is output from an output terminal. The light emitting control circuit can generate the light emitting control signal EM based on the emission start signal ESTV. Therefore, the duty cycle of the emission start signal ESTV determines the duty cycle of the light emitting control signal EM. When the display brightness of the light emitting element is not in a predetermined brightness range, the duty cycle of the light emitting starting signal ESTV and the duty cycle of the light emitting control signal EM can be adjusted to further adjust the duty cycle of the bright state in the display brightness waveform of the light emitting element, thereby realizing the control of the light emitting brightness of the light emitting element.

In some exemplary implementations, the DDIC chip pre-stores a second mapping relationship according to which the emission start signal compensation amount corresponding to the target refresh frequency can be determined. As shown in Table 2, the second mapping relationship stored in the DDIC chip may include a column of the refresh frequencies and a corresponding column of the emission start signal compensation amounts, and there is a one to one correspondence between a refresh frequency and an emission start signal compensation amount.

TABLE 2

| Second Mapping Relationship | |
|---|---|
| Refresh frequency 1 | ESTV compensation amount 1 |
| Refresh frequency 2 | ESTV compensation amount 2 |
| . . . | . . . |
| Refresh frequency n | ESTV compensation amount n |

In some exemplary implementations, the refresh frequency for which the ESTV compensation amount is 0 and the corresponding ESTV compensation amount for the remaining refresh frequencies may be recorded in Table 2. For example, the ESTV compensation amount in Table 2 can be greater than 0. However, this embodiment is not limited thereto. For example, the ESTV compensation amount in Table 2 can be less than 0.

In some exemplary implementations, a repetition duration of the emission start signal ESTV consists of a high level and a low level. The duty cycle of the ESTV is the ratio of the duration of the high level to the total duration within a repetition duration.

Figure 7:
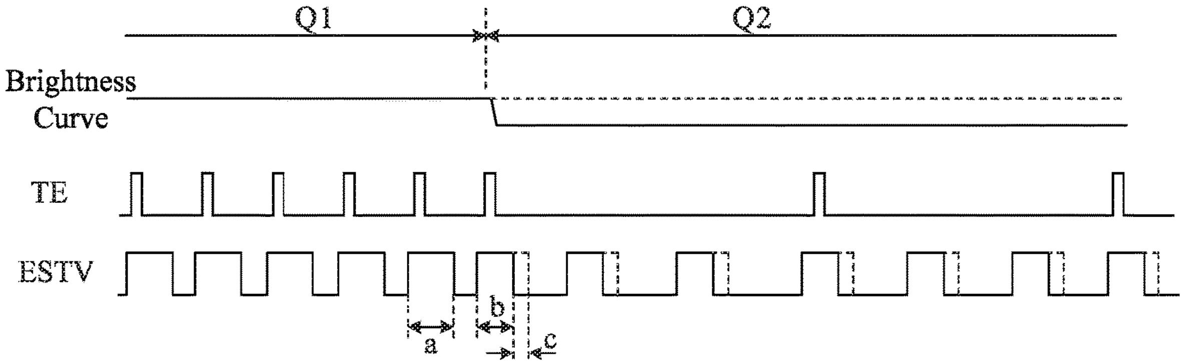
FIG. 7 is a schematic diagram of an ESTV compensation according to at least one embodiment of the present disclosure.

FIG. 7 is a schematic diagram of an ESTV compensation according to at least one embodiment of the present disclosure. In this example, the low level duration of the ESTV in a frame can effectively control the brightness of the display screen of this frame as an example. Wherein, the longer the low level duration of the ESTV, the greater the brightness of the display screen.

In some exemplary implementations, as shown in FIG. 7 the original refresh frequency of the display panel is Q1 and the target refresh frequency is Q2. Wherein, Q1 can be greater than Q2. At the original refresh frequency Q1, the high level duration of ESTV is a; at the target refresh frequency Q2, the high level duration of ESTV is (b+c). Wherein, c is the ESTV compensation amount determined according to the second mapping relationship. In this example, when the display panel is switched from an original refresh frequency Q1 to a target refresh frequency Q2 (for example, from a high refresh frequency to a low refresh frequency), screen flicker caused by a decrease in brightness will occur, the DDIC chip can determine the ESTV compensation amount c corresponding to the target refresh frequency according to the second mapping relationship, and prolong the high level of ESTV at the low refresh frequency for a duration of c, thereby improving the brightness of the display screen so that the brightness of the display screen remains consistent. The brightness curve of the dotted line in FIG. 7 is the brightness curve after the ESTV compensation.

In other examples, when the display panel is switched from a low refresh frequency to a high refresh frequency, screen flicker caused by a brightness rise occurs. The DDIC chip can determine the ESTV compensation amount corresponding to the target refresh frequency according to the second mapping relationship, and shorten the high level of the ESTV at the high refresh frequency for a duration of c, so that the brightness of the display screen remains consistent. However, this embodiment is not limited thereto. In other examples, the high level duration of ESTV within a frame can effectively control the display brightness of this frame.

In this exemplary implementation, the DDIC chip of the present embodiment can determine the ESTV compensation amount according to the target refresh frequency of the display panel, thereby improving the brightness change in the refresh frequency switching process and realizing the dynamic non-inductive switching of the refresh frequency.

In some exemplary implementations, the gamma voltage (i.e. the aforementioned expected output data voltage) may directly determine the display screen brightness. When the display panel performs frequency switching (for example, switching from the original refresh frequency to the target refresh frequency), since the display brightness changes, the brightness consistency at different refresh frequencies can be maintained by fine tuning the gamma voltage at different refresh frequencies.

In some exemplary implementations, the DDIC chip pre-stores a third mapping relationship according to which a gamma voltage compensation amount corresponding to a target refresh frequency can be determined. As shown in Table 3, a pre-stored third mapping relationship of the DDIC chip may include a column of the refresh frequencies and a corresponding column of the gamma voltage compensation amounts, and there is a one to one correspondence between a refresh frequency and a gamma voltage compensation amount.

TABLE 3

| Third Mapping Relationship | |
|---|---|
| Refresh frequency 1 | Gamma voltage compensation amount 1 |
| Refresh frequency 2 | Gamma voltage compensation amount 2 |
| . . . | . . . |
| Refresh frequency n | Gamma voltage compensation amount n |

In some exemplary implementations, the refresh frequency for which the gamma voltage compensation amount is 0 and the corresponding gamma voltage compensation amount for the remaining refresh frequencies may be recorded in Table 3. For example, the gamma voltage compensation amount in Table 3 can be greater than 0. However, this embodiment is not limited thereto. For example, the gamma voltage compensation amount in Table 3 may be less than 0.

Figure 8:
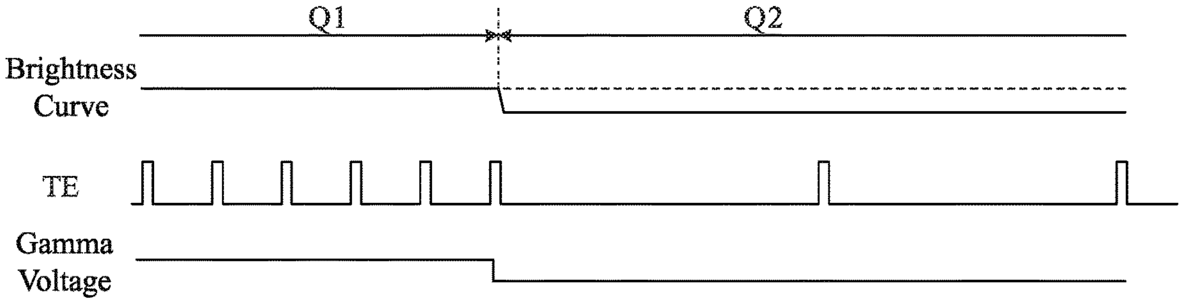
FIG. 8 is a schematic diagram of gamma voltage compensation according to at least one embodiment of the present disclosure.

FIG. 8 is a schematic diagram of gamma voltage compensation according to at least one embodiment of the present disclosure. In some exemplary implementations, as shown in FIG. 8 the original refresh frequency of the display panel is Q1 and the target refresh frequency is Q2. Wherein, Q1 is greater than Q2. When the display panel is switched from an original refresh frequency Q1 to a target refresh frequency Q2 (e.g., from a high refresh frequency to a low refresh frequency), screen flicker caused by a decrease in brightness will occur, the DDIC chip can determine the gamma voltage compensation amount corresponding to the target refresh frequency according to the third mapping relationship, and reduce the gamma voltage compensation amount so as to keep the brightness of the display picture consistent. The brightness curve of the dotted line in FIG. 8 is a brightness curve after the gamma voltage compensation. However, this embodiment is not limited thereto. In other examples, when the display panel is switched from the low refresh frequency to the high refresh frequency, the DDIC chip can determine the gamma voltage compensation amount corresponding to the target refresh frequency according to the third mapping relationship, and compensate the gamma voltage so that the brightness of the display screen is consistent. The present embodiment is not limited to the compensation for the decreasing or increasing of the gamma voltage, and can be set in combination with the brightness change of the display panel and the transistor type in practical applications.

The control method provided by the present embodiment dynamically adjusts the data chopping rule according to the target refresh frequency of the display panel, which can not only ensure better power consumption income under conventional display, but also ensure the improvement of flicker effect during low frequency display. Moreover, the brightness change in the switching process can be improved by ESTV compensation and gamma voltage compensation during the switching process of refresh frequency, thus realizing dynamic non-inductive switching of refresh frequency.

Figure 9:
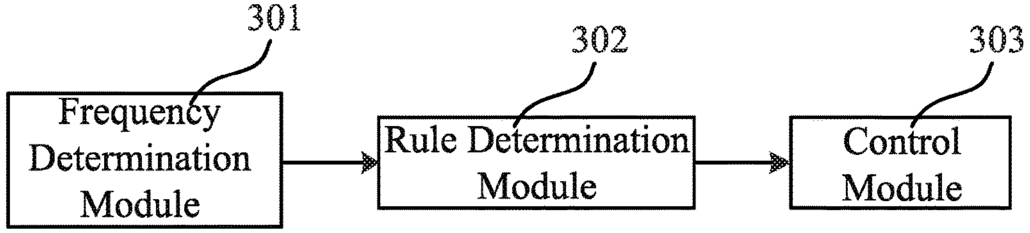
FIG. 9 is a schematic diagram of a control apparatus for a display panel according to at least one embodiment of the present disclosure.

FIG. 9 is a schematic diagram of a control apparatus for a display panel according to at least one embodiment of the present disclosure. In some exemplary implementations, as shown in FIG. 9 the control apparatus of the present embodiment may include a frequency determination module 301, a rule determination module 302 and a control module 303. The frequency determination module 301 is configured to determine a target refresh frequency of the display panel. The rule determination module 302 is configured to determine a data chopping rule adapted to the target refresh frequency according to the first mapping relationship. The control module 303 is configured to provide data signals to the display panel according to the data chopping rule.

Figure 10:
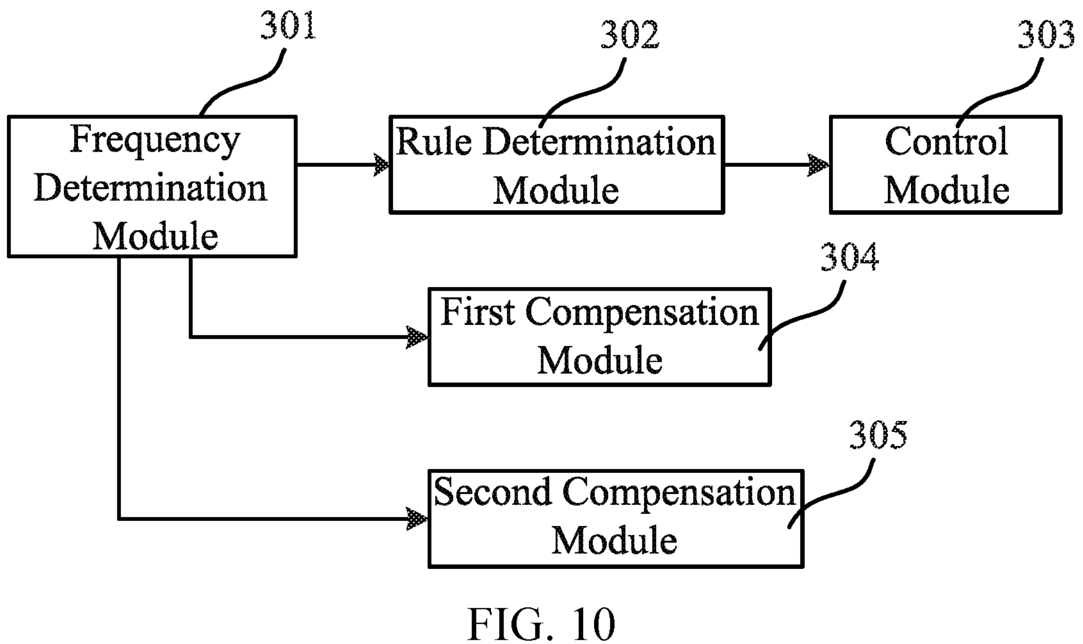
FIG. 10 is another schematic diagram of a control apparatus for a display panel according to at least one embodiment of the present disclosure.

FIG. 10 is another schematic diagram of a control apparatus for a display panel according to at least one embodiment of the present disclosure. In some exemplary implementations, as shown in FIG. 10 the control apparatus of the present embodiment may further include: a first compensation module 304 configured to determine an emission start signal compensation amount corresponding to a target refresh frequency according to the second mapping relationship; when the display panel is switched to the target refresh frequency, an emission start signal is compensated by using the emission start signal compensation amount corresponding to the target refresh frequency.

In some exemplary embodiments, as shown in FIG. 10 the control apparatus of the present embodiment may further include a second compensation module 305 configured to determine a gamma voltage compensation amount corresponding to a target refresh frequency according to the third mapping relationship; when the display panel is switched to a target refresh frequency, a data voltage supplied to the display panel is compensated by using a gamma voltage compensation amount corresponding to the target refresh frequency.

Relevant description of the control apparatus for the display panel of the present embodiment may refer to the descriptions in the aforementioned embodiments, and thus will not be repeated here.

Figure 11:
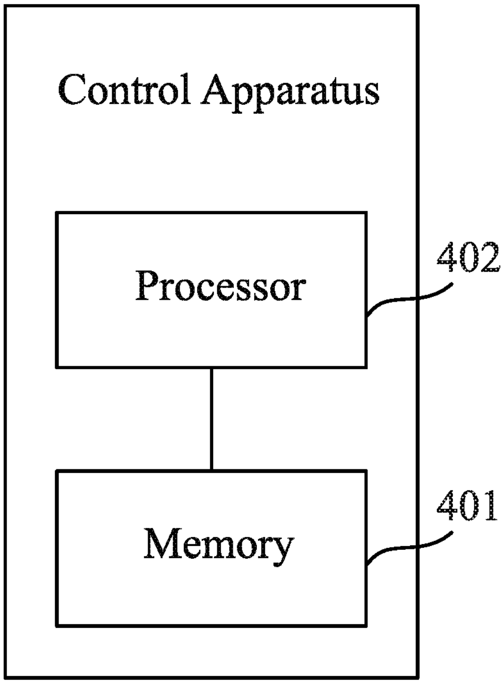
FIG. 11 is another schematic diagram of a control apparatus according to at least one embodiment of the present disclosure.

FIG. 11 is another schematic diagram of a control apparatus according to at least one embodiment of the present disclosure. In some exemplary embodiments, as shown in FIG. 11, the control apparatus of the present embodiment may include: a memory 401 and a processor 402. The memory 401 is configured to store a computer program, and the processor 402 is configured to execute the computer program to implement the aforementioned control method.

In some exemplary embodiments, the processor 402 of the control apparatus may include a processing apparatus such as a Microcontroller Unit (MCU), or a Field-Programmable Gate Array (FPGA), or the like. The memory 401 of the control apparatus may store a gray conversion comparison table, a parameter comparison table, as well as software programs and modules of application software, such as program instructions or modules corresponding to the method in the present embodiment. The processor 402 performs various function applications and data processing by running the software program and modules stored in the memory 401, for example, implements the method provided in this embodiment. The memory 401 may include a high-speed random access memory, and may also include a non-volatile memory such as one or more magnetic storage apparatuses, flash memories, or other non-volatile solid-state memories. In some examples, the memory may include memories remotely provided with respect to the processor, and these remote memories may be connected with the control apparatus through a network. Examples of the above network include, but are not limited to, the Internet, an intranet, a local area network, a mobile communication network, and combinations thereof.

Figure 12:
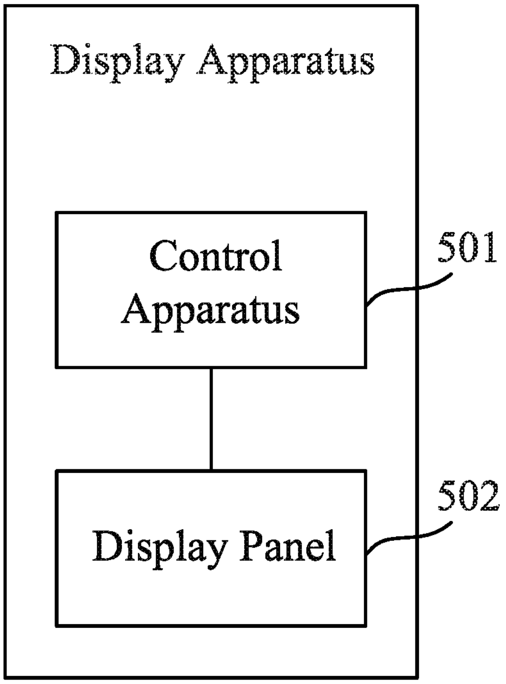
FIG. 12 is a schematic diagram of a display apparatus according to at least one embodiment of the present disclosure.

FIG. 12 is a schematic diagram of a display apparatus according to at least one embodiment of the present disclosure. In some exemplary embodiments, as shown in FIG. 12, the display apparatus of the present embodiment may include: a display panel 502 and a control apparatus 501. The control apparatus 501 is configured to provide a data signal to the display panel 502.

In some exemplary embodiments, the display panel 502 may include: a pixel array. The pixel array includes multiple sub-pixels, wherein at least one sub-pixel includes a light emitting element and a pixel circuit that drives the light emitting element to emit light. The pixel circuit includes: multiple transistors and at least one capacitor. Relevant description of the display apparatus of the present embodiment may refer to the descriptions in the aforementioned embodiments, and thus will not be repeated here.

In addition, at least one embodiment of the present disclosure further provides a non-transitory computer-readable storage medium, storing a computer program, wherein when the computer program is performed, the acts of the above control method are implemented.

Those of ordinary skills in the art may understand that all or some of acts in methods, functional modules or units in systems and apparatuses disclosed above may be implemented as software, firmware, hardware, and an appropriate combination thereof. In a hardware implementation mode, a division between functional modules or units mentioned in the above description does not necessarily correspond to a division of physical components. For example, a physical component may have multiple functions, or a function or an act may be performed by several physical components in cooperation. Some certain components or all components may be implemented as software executed by a processor such as a digital signal processor or a microprocessor, or implemented as hardware, or implemented as an integrated circuit such as an application-specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

The above shows and describes basic principles, main features, and advantages of the present disclosure. The present disclosure is not limited by the above embodiments. The above embodiments and descriptions in the specification only illustrate the principles of the present disclosure. Without departing from the spirit and scope of the present disclosure, there will be many changes and improvements in the present disclosure, and all of these changes and improvements fall within the protection scope of the present disclosure.

The invention claimed is:

1. A control method for a display panel, comprising:

determining a target refresh frequency of the display panel;

determining a data chopping rule adapted to the target refresh frequency according to a first mapping relationship; and providing a data signal to the display panel according to the data chopping rule;

wherein the determining the target refresh frequency of the display panel comprises one of the following:

determining the target refresh frequency of the display panel according to received frame rate switching command; and determining the target refresh frequency of the display panel by analyzing received MIPI (Mobile Industry Processor Interface) data.

2. The method according to claim 1, wherein the data chopping rule comprises one of the following: frame flipping, dot flipping.

3. The method according to claim 2, further comprising: determining an emission start signal compensation amount corresponding to the target refresh frequency according to a second mapping relationship.

4. The method according to claim 2, further comprising: determining a gamma voltage compensation amount corresponding to the target refresh frequency according to a third mapping relationship.

5. A control apparatus, comprising: a memory and a processor; wherein the memory is configured to store a computer program, and the processor is configured to execute the computer program to implement the control method of claim 2.

6. The method according to claim 1, further comprising: determining a gamma voltage compensation amount corresponding to the target refresh frequency according to a third mapping relationship.

7. The method according to claim 6, further comprising: when the display panel is switched to the target refresh frequency, compensating a data voltage supplied to the display panel by using the gamma voltage compensation amount corresponding to the target refresh frequency.

8. A control apparatus, comprising: a memory and a processor, wherein the memory is configured to store a computer program, and the processor is configured to execute the computer program to implement the control method of claim 1.

9. A non-transitory computer readable storage medium, storing a computer program, wherein when the computer program is performed, the control method of claim 1 is implemented.

10. A control apparatus for a display panel, comprising:

a frequency determination module configured to determine a target refresh frequency of the display panel;

a rule determination module configured to determine a data chopping rule adapted to the target refresh frequency according to a first mapping relationship; and a control module configured to provide a data signal to the display panel according to the data chopping rule;

wherein the frequency determination module is configured to:

determine the target refresh frequency of the display panel according to received frame rate switching command; or determine the target refresh frequency of the display panel by analyzing received MIPI (Mobile Industry Processor Interface) data.

11. The control apparatus according to claim 10, further comprising: a first compensation module configured to determine an emission start signal compensation amount corresponding to the target refresh frequency according to a second mapping relationship; wherein when the display panel is switched to the target refresh frequency, an emission start signal is compensated by using the emission start signal compensation amount corresponding to the target refresh frequency.

12. The control apparatus according to claim 11, further comprising: a second compensation module configured to determine a gamma voltage compensation amount corresponding to the target refresh frequency according to a third mapping relationship; wherein when the display panel is switched to the target refresh frequency, a data voltage supplied to the display panel is compensated by using the gamma voltage compensation amount corresponding to the target refresh frequency.

13. A display apparatus, comprising a display panel and the control apparatus according to claim 11.

14. The control apparatus according to claim 10, further comprising: a second compensation module configured to determine a gamma voltage compensation amount corresponding to the target refresh frequency according to a third mapping relationship; wherein when the display panel is switched to the target refresh frequency, a data voltage supplied to the display panel is compensated by using the gamma voltage compensation amount corresponding to the target refresh frequency.

15. A display apparatus, comprising a display panel and the control apparatus according to claim 10.

16. The display apparatus according to claim 15, wherein the display panel comprises: a pixel array, the pixel array comprises a plurality of sub-pixels, and at least one sub-pixel comprises a light emitting element and a pixel circuit driving the light emitting element to emit light; and the pixel circuit comprises a plurality of transistors and at least one capacitor.

17. A control method for a display panel, comprising:

determining a target refresh frequency of the display panel;

determining a data chopping rule adapted to the target refresh frequency according to a first mapping relationship; and providing a data signal to the display panel according to the data chopping rule;

further comprising: determining an emission start signal compensation amount corresponding to the target refresh frequency according to a second mapping relationship.

18. The method according to claim 17, further comprising: when the display panel is switched to the target refresh frequency, compensating an emission start signal by using the emission start signal compensation amount corresponding to the target refresh frequency.

* * * * *